United States Patent
Frankenberger

(10) Patent No.: US 9,975,069 B2
(45) Date of Patent: May 22, 2018

(54) CONVEYOR BELT FILTER DEVICE

(71) Applicant: Guido Frankenberger, Wetzlar (DE)

(72) Inventor: Guido Frankenberger, Wetzlar (DE)

( * ) Notice: Subject to any disclaimer, the term of this patent is extended or adjusted under 35 U.S.C. 154(b) by 972 days.

(21) Appl. No.: 14/313,410

(22) Filed: Jun. 24, 2014

(65) Prior Publication Data

US 2014/0374337 A1 Dec. 25, 2014

(30) Foreign Application Priority Data

Jun. 25, 2013 (DE) .................. 10 2013 212 081

(51) Int. Cl.
| | | |
|---|---|---|
| *E03F 5/14* | (2006.01) | |
| *B01D 33/333* | (2006.01) | |
| *E02B 8/02* | (2006.01) | |
| *B01D 33/048* | (2006.01) | |
| *B01D 33/46* | (2006.01) | |
| *B01D 33/76* | (2006.01) | |
| *C02F 11/12* | (2006.01) | |

(52) U.S. Cl.
CPC .......... *B01D 33/333* (2013.01); *B01D 33/048* (2013.01); *E02B 8/026* (2013.01); *B01D 33/461* (2013.01); *B01D 33/76* (2013.01); *C02F 11/123* (2013.01); *E03F 5/14* (2013.01)

(58) Field of Classification Search
CPC .. B01D 33/333; B01D 33/461; B01D 33/465; B01D 33/76; E02B 8/023; E02B 8/026; E03F 5/14
USPC .................. 210/158, 159, 160, 396
See application file for complete search history.

(56) References Cited

U.S. PATENT DOCUMENTS

| | | | | |
|---|---|---|---|---|
| 658,196 | A * | 9/1900 | Whitney | B01D 33/04 210/158 |
| 5,565,093 | A * | 10/1996 | Frankenberger | B01D 33/333 210/158 |
| 5,800,701 | A * | 9/1998 | Larsen | B01D 33/333 210/158 |
| 6,280,612 | B1 * | 8/2001 | Kroos | E02B 8/026 210/158 |
| 8,500,997 | B2 * | 8/2013 | Grammelsberger | E02B 8/026 210/158 |
| 2007/0241039 | A1 | 10/2007 | Wilcher et al. | |
| 2011/0139693 | A1 * | 6/2011 | Frankenberger | E02B 8/026 210/160 |

(Continued)

FOREIGN PATENT DOCUMENTS

DE 1432323 * 4/1969

*Primary Examiner* — Christopher Upton
(74) *Attorney, Agent, or Firm* — King & Schickli, PLLC

(57) ABSTRACT

The invention relates to a conveyor belt filter device for mechanically cleaning a liquid which flows through a channel and is polluted with solids, comprising an endless filter belt of interconnected flat filter elements which can be pivoted against one another, and a flexible driving means which is guided over a lower deflection device and at least one upper deflection device and comprising a framework which carries the deflection devices and the filter belt, wherein in the area of the upper deflection device a wiper device is arranged which can be driven to rotate and is arranged on a swinging link which is mounted on the framework, the wiper device being supported against the weight of the wiper device by a support device, and the support device being arranged together with the upper deflection device on a common carrier which is adjustable with respect to the framework.

20 Claims, 2 Drawing Sheets

(56) References Cited

U.S. PATENT DOCUMENTS

2012/0175294 A1* 7/2012 Kim .................. E03F 5/14
                                              210/249

* cited by examiner

CONVEYOR BELT FILTER DEVICE

The disclosure of German Patent Application 10 2013 212 081.8 is incorporated herein by reference.

TECHNICAL FIELD

The present invention relates to a conveyor belt filter device for mechanically cleaning a liquid which flows through a channel and is polluted with solids, comprising an endless filter belt of interconnected flat filter elements which can be pivoted against one another, and a flexible driving means which is guided over a lower deflection device and at least one upper deflection device, and a framework which carries the deflection devices and the filter belt, wherein in the area of the upper deflection device a wiper device is arranged which can be driven to rotate and is arranged on a swinging link which is mounted on the framework, the wiper device being supported against the weight of the wiper device by a support device, and the support device being arranged together with the upper deflection device on a common carrier which is adjustable with respect to the framework.

BACKGROUND

Conveyor belt filter devices of the kind mentioned above are also known as so-called paternoster filter rakes and primarily serve to mechanically clean flowing waste water in channels formed for this purpose. The waste water flows transversally through the filter elements or also in the longitudinal direction of the filter elements and the latter carry the filtrate, which cannot pass the filter elements, out of the channel. In the area of an upper deflection device of the filter belt, said deflection device being arranged above the waste water surface, a wiper device is provided, which is implemented as a rotating brush, for example, and which removes filtrate sticking to the filter elements from the filter elements in a wiping process before they again dive into the liquid flowing through the channel in the course of the circulation of the filter belt. Since the effectiveness of the wiping process depends for a large part on the contact force with which the wiper device bears against the filter elements and because it is substantial for avoiding excessive wear to set the contact force as low as possible, it is substantial for the desired smooth operation of a conveyor belt filter device to allow for an optimal setting of the contact force and to provide for corresponding adjusting means at the wiper device and at the conveyor belt filter device.

Besides the adjustments or changes to the setting of the contact force which become necessary because of unavoidable wear in the course of the operation of the wiper device, adjustments of the wiper device also become necessary when a change of the center distance between the deflection devices of the conveyor belt is required because of a wear of the flexible driving means of the conveyor belt filter device and a corresponding elongation of the driving means.

SUMMARY

It is the object of the present invention to limit the adjustment measures necessary for the optimal operation of a wiper device to a minimum and to thus reduce a corresponding maintenance load without compromising operational safety.

The object is attained by a conveyor belt filter device having the features of claim 1.

In the conveyor belt filter device according to the invention, the wiper device is supported against the weight of the wiper device by a support device, said support device being arranged together with the upper deflection device on a common carrier which is adjustable with respect to the framework.

According to the invention, a common basis is thus created for the upper deflection device and the support device, with the result that a relative adjustment of the position of the upper deflection device, as becomes necessary for compensating an elongation of the driving means, for example, always causes a simultaneous and equally large adjustment of the support device with respect to the framework. Owing to the design according to the invention, following an adjustment of the relative position of the upper deflection device, it is no longer necessary to correspondingly adjust the relative position of the support device with respect to the framework in order to ensure that a contact force effected onto the filter belt elements by the wiper device remains substantially constant.

It is particularly advantageous if the support device is arranged on the carrier together with a shaft bearing of a deflection shaft of the upper deflection device because the carrier can thus simultaneously serve the formation of a shaft bearing or the formation of a bearing seat for the shaft bearing of the upper deflection device.

In an advantageous embodiment, the swinging link is mounted above the deflection shaft so that a reliable, gravity-related contact between the support device and the wiper device is ensured.

While it is possible to provide the support device with weights for generating a support force of the support device, it is particularly advantageous if the support device has a spring device for generating a support force so that dynamic reset forces are generated which provide for a quick reduction of a contact gap in case a contact gap formed between the wiper device and the filter elements widens as a result of the passage of larger filtrate objects.

If the spring device has a spring support that is adjustable with respect to the carrier according to a preferred embodiment of the conveyor belt filter device, adjustments to the setting of the contact force effected on the filter belt by the wiper device can be made in a simple manner by changing the pretension of the spring device.

It is particularly advantageous with regard to a simple-structured spring device if it is formed as a tension spring device because this makes a lateral guide of the spring device, such as a guiding sleeve preventing a buckling of the spring device, unnecessary.

With regard to a construction that is as compact as possible, it is advantageous if the support device is formed as a support lever which is mounted on the carrier in a pivot bearing in such a manner that a support axis defined by the spring device is laterally offset to a support end of the support lever, said support end acting on the wiper device, so that the spring device can be arranged on the same side of the framework as the conveyor belt drive, for example, without thereby enlarging the breadth of the conveyor belt filter device.

If the swinging link by means of which the wiper device is pivotably arranged on the framework forms an angle of larger than 60° with a longitudinal axis of the filter belt, a desired pivoting of the wiper device away from the filter belt is supported in the case of larger objects being transported out of the liquid by the filter belt so as to prevent damage to the wiper device and to the filter belt due to the objects becoming jammed in between the wiper device and the filter belt.

BRIEF DESCRIPTION OF THE DRAWINGS

In the following, a preferred embodiment of the invention will be explained in more detail with the aid of the drawing. In the figures.

DETAILED DESCRIPTION

Figure 1:
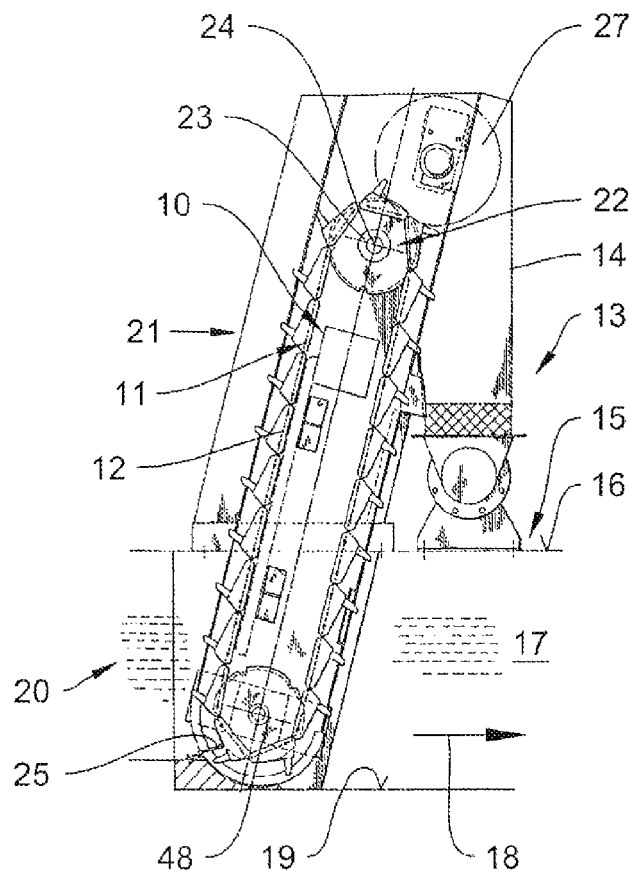
FIG. 1 shows a lateral view of a conveyor belt filter device in operation.

The conveyor belt filter device illustrated in FIG. 1 comprises a framework 10, a filter belt 11 guided on the framework 10, a chain drive 12 connected to the framework 10 and the filter belt 11 and a filtrate discharge 13 with a discharge channel 14. The conveyor belt filter device serves to clean a channel 15 which runs below an installation level 16 of the conveyor belt filter device.

A liquid 17 loaded with solids flows through the channel 15 in a flowing direction 18 illustrated by a directional arrow, wherein the channel 15 can extend with extensive width vertically to the paper plane. The conveyor belt filter device reaches down to a channel bottom 19 so that the entire flow cross-section of the channel 15 is blocked transversally to the flow direction 18 so that the liquid 17 as to pass through the part of the conveyor belt filter device that is located in the channel 15.

In the present case, the framework 10 consists of a lower frame portion 20, which forms the portion to be passed by the liquid 17, and an upper frame portion 21, which is located outside of the channel 15 and, at its upper end in an upper deflection device 22, has a shaft bearing 23 which serves as a bearing for an upper deflection shaft 24 which allows the filter belt 11 to circulate in cooperation with a lower deflection shaft 25 of a lower deflection device 48 which is arranged at the bottom end of the lower frame portion 20 that is arranged within the liquid 17. In deviation from the embodiment illustrated in FIG. 1, the conveyor belt filter device can comprise multiple upper deflection devices arranged above or outside of the channel 15 so as to allow a defined deflection of the filter belt in the area of a wiper device 27.

Figure 2:
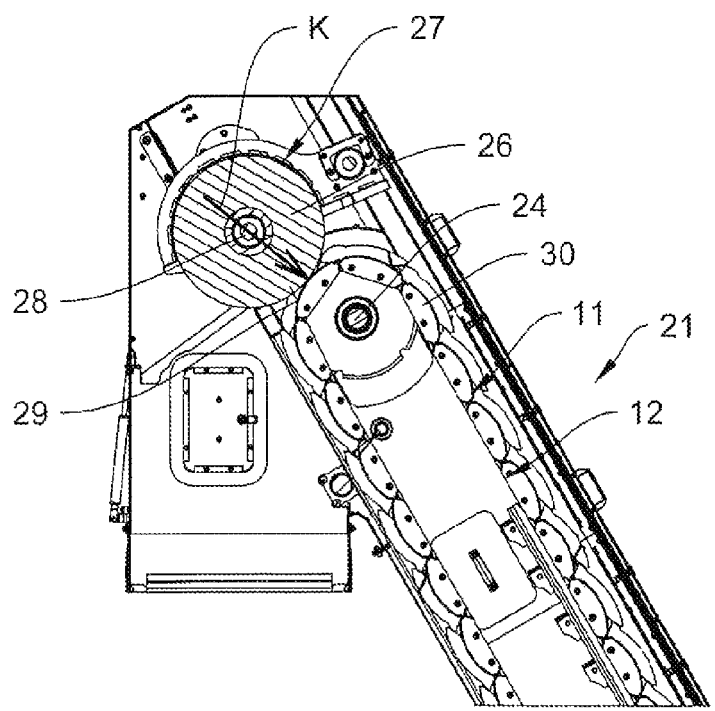
FIG. 2 shows an enlarged partial illustration of an upper frame portion of the conveyor belt filter device illustrated in FIG. 1 in a longitudinal section and viewed from the opposite side.

As is shown in particular in FIG. 2, in the illustrated embodiment, the wiper device 27, which in the present case has a rotating brush 26, is located above the upper deflection shaft 24. The brush 26 is arranged on a wiper shaft 28 and bears with a contact force K against a filter surface 29 of filter elements 30 which are pivotably interconnected via the chain drive 12 and thus form the filter belt 11.

Figure 3:
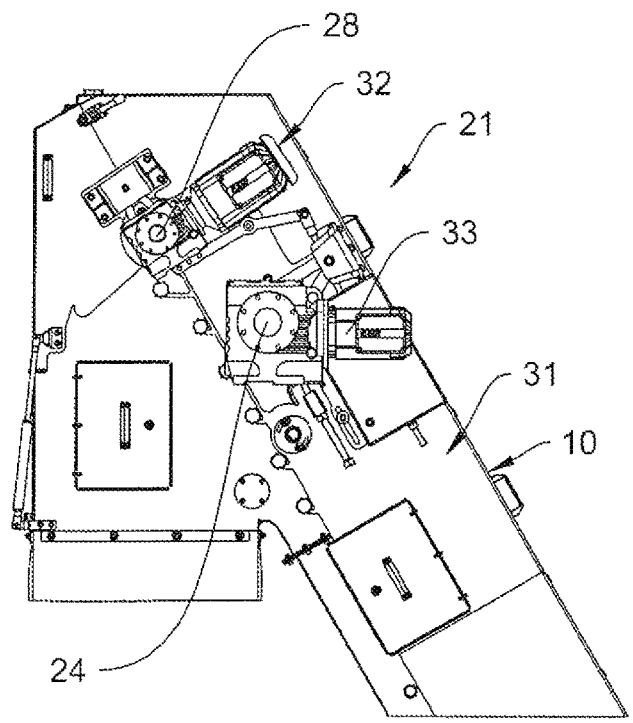
FIG. 3 shows a lateral view of the upper frame portion of the filter belt conveyor device illustrated in FIG. 2.
Figure 4:
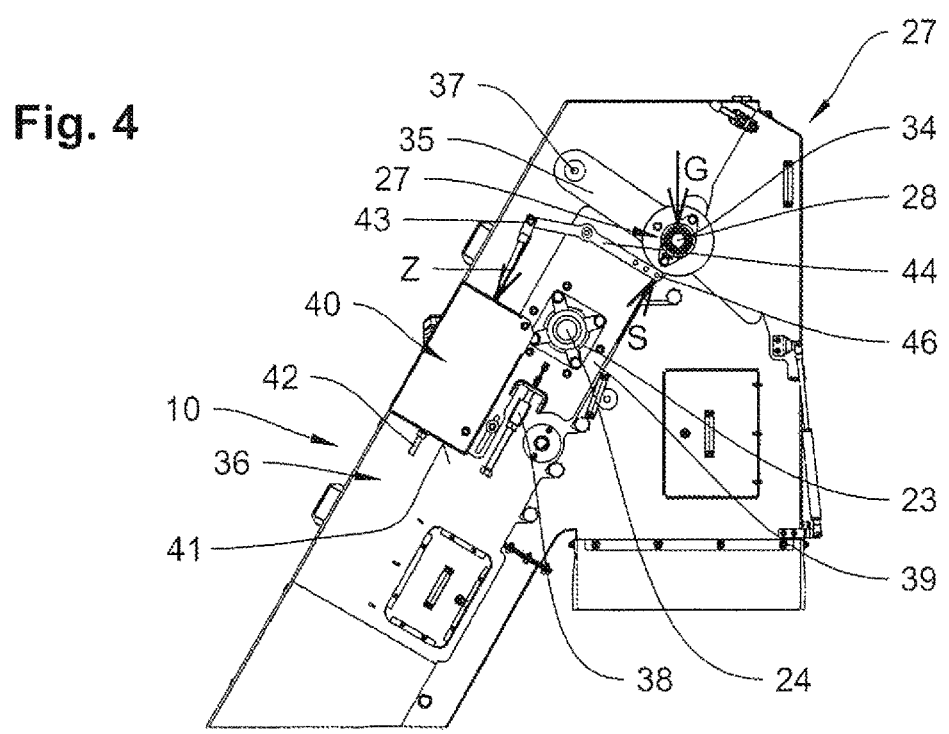
FIG. 4 shows the conveyor belt filter device in a lateral view opposite to the lateral view illustrated in FIG. 3.

In each of FIGS. 3 and 4, the upper frame portion 21 is illustrated in a lateral view, FIG. 3 showing an input side 31 with a wiper drive 32 arranged on the wiper shaft 28 and a filter belt drive 33 arranged on the upper deflection shaft 24, and FIG. 4 showing an output side 36 with the wiper shaft 28 mounted in a wiper shaft bearing 34 and the deflection shaft 24 mounted in a shaft bearing 23.

As can further be taken from FIGS. 3 and 4, the wiper shaft 28 of the wiper device 27 is mounted in the wiper shaft bearings 34 on the free end of a swinging link 35, which is mounted on the input side 31 and on the output side 36 in a respective swinging link bearing 37 above the deflection point defined by the upper deflection shaft 24. A carrier 39 is located both on the input side 31 and on the output side 36, which is designed as a carrier plate in this case and is arranged slidably on the framework 10 and adjustably by means of adjusting devices 38 and on which the shaft bearings 23 of the upper deflection shaft 24 are arranged and which simultaneously serves as a fastening device for a spring device 40, which is designed as a tension spring in the illustrated embodiment example and which is connected with one spring end to a force transmission 41 formed on the carrier 39. In the present case, the force transmission 41 comprises an adjusting device 42 which makes it possible to influence the pretension of the spring device 40 and thus the tension force Z acting on a spring connection end 43 of a support lever 44.

The support lever 44 is also mounted on the carrier 39 in a lever joint 45. Hence, an increase of the tension force Z on the spring connection end 43 causes the support lever 44 to pivot in the counter-clockwise sense and thus also causes a support force S which acts on the swinging link 35 and on the wiper shaft bearing 34 arranged on a support end 46 of the swinging link 35, said support force counteracting a weight of the wiper device 27.

The afore-described arrangement of the shaft bearing 23 of the upper deflection shaft 24 and the force transmission 41 of the spring device 40 and of the lever joint 45 of the support lever 44 on the common carrier 39 results in a change of the distance between the lower deflection device 48 and the upper deflection device 22, i.e. in the case of the illustrated embodiment example a change of the distance between the deflection shafts 24 and 25, of the chain drive 12 by actuation of the adjusting device 38 causing an equally large adjustment of the support end 46 of the support lever 43 so that the contact force K between the wiper device 27, i.e. the brush 26, and the filter surface 29 of the filter elements 30 remains constant following a corresponding pivoting of the swinging links 35.

For setting a desired contact force K, the pretension of the spring device 40 can be adjusted by simply adjusting the adjusting device 42 acting on the force transmission 41.

In the embodiment example illustrated in FIGS. 3 and 4, the spring device 40 is arranged in a mesh cage 47 so as to prevent a collision with objects which might compromise the spring effect.

| List of reference signs | |
|---|---|
| 10 | framework |
| 11 | filter belt |
| 12 | chain drive |
| 13 | filtrate discharge |
| 14 | discharge channel |
| 15 | channel |
| 16 | installation level |
| 17 | liquid |
| 18 | flow direction |
| 19 | channel bottom |
| 20 | lower frame portion |
| 21 | upper frame portion |
| 22 | upper deflection device |
| 23 | shaft bearing |
| 24 | upper deflection shaft |
| 25 | lower deflection shaft |

-continued

| | List of reference signs |
|---|---|
| 26 | brush |
| 27 | wiper device |
| 28 | wiper shaft |
| 29 | filter surface |
| 30 | filter element |
| 31 | input side |
| 32 | wiper drive |
| 33 | filter belt drive |
| 34 | wiper shaft bearing |
| 35 | swinging link |
| 36 | output side |
| 37 | swinging link bearing |
| 38 | adjusting device |
| 39 | carrier |
| 40 | spring device |
| 41 | force transmission |
| 42 | adjusting device |
| 43 | spring connection end |
| 44 | support lever |
| 45 | lever joint |
| 46 | support end |
| 47 | mesh cage |
| 48 | lower deflection device |

The invention claimed is:

1. A conveyor belt filter device for mechanically cleaning a liquid (17) which flows through a channel (15) and is polluted with solids, comprising an endless filter belt (11) of interconnected flat filter elements (30) which can be pivoted against one another, and a flexible driving means which is guided over a lower deflection device (48), and at least one upper deflection device (22), and a framework (10) which carries the deflection devices and the filter belt, wherein in the area of the upper deflection device a wiper device (27) is arranged which can be driven to rotate and is arranged on a swinging link (35) which is mounted on the framework, the swinging link being supported against the weight of the wiper device by a support device, and the support device being arranged together with the upper deflection device on a common carrier (39) which is adjustable with respect to the framework.

2. The conveyor belt filter device according to claim 1, characterized in that the support device is arranged on the carrier (39) together with a shaft bearing of a deflection shaft of the upper deflection device.

3. The conveyor belt filter device according to claim 2, characterized in that the swinging link (35) is mounted above the deflection shaft.

4. The conveyor belt filter device according to claim 3, characterized in that the support device has a spring device (40) for generating a support force.

5. The conveyor belt filter device according to claim 4, characterized in that the support device has a support lever (44) which is mounted on the carrier in a pivot bearing in such a manner that a support axis defined by the spring device (40) is laterally offset with respect to a support end (46) of the support lever, said support end acting on the wiper device (27).

6. The conveyor belt filter device according to claim 3, characterized in that the swinging link (35) forms an angle of larger than 60° with a longitudinal axis of the filter belt.

7. The conveyor belt filter device according to claim 2, characterized in that the support device has a spring device (40) for generating a support force.

8. The conveyor belt filter device according to claim 7, characterized in that the support device has a support lever (44) which is mounted on the carrier in a pivot bearing in such a manner that a support axis defined by the spring device (40) is laterally offset with respect to a support end (46) of the support lever, said support end acting on the wiper device (27).

9. The conveyor belt filter device according to claim 2, characterized in that the swinging link (35) forms an angle of larger than 60° with a longitudinal axis of the filter belt.

10. The conveyor belt filter device according to claim 1, characterized in that the support device has a spring device (40) for generating a support force.

11. The conveyor belt filter device according to claim 10, characterized in that the spring device (40) has a spring support which is adjustable with respect to the carrier (39).

12. The conveyor belt filter device according to claim 11, characterized in that the spring device (40) is formed as a tension spring.

13. The conveyor belt filter device according to claim 11, characterized in that the support device has a support lever (44) which is mounted on the carrier in a pivot bearing in such a manner that a support axis defined by the spring device (40) is laterally offset with respect to a support end (46) of the support lever, said support end acting on the wiper device (27).

14. The conveyor belt filter device according to claim 10, characterized in that the spring device (40) is formed as a tension spring.

15. The conveyor belt filter device according to claim 14, characterized in that the support device has a support lever (44) which is mounted on the carrier in a pivot bearing in such a manner that a support axis defined by the spring device (40) is laterally offset with respect to a support end (46) of the support lever, said support end acting on the wiper device (27).

16. The conveyor belt filter device according to claim 10, characterized in that the support device has a support lever (44) which is mounted on the carrier in a pivot bearing in such a manner that a support axis defined by the spring device (40) is laterally offset with respect to a support end (46) of the support lever, said support end acting on the wiper device (27).

17. The conveyor belt filter device according to claim 10, characterized in that the swinging link (35) forms an angle of larger than 60° with a longitudinal axis of the filter belt.

18. The conveyor belt filter device according to claim 1, characterized in that the swinging link (35) forms an angle of larger than 60° with a longitudinal axis of the filter belt.

19. A conveyor belt filter device for mechanically cleaning a liquid (17) which flows through a channel (15) and is polluted with solids, comprising an endless filter belt (11) of interconnected flat filter elements (30) which can be pivoted against one another, and a flexible drive which is guided over a lower deflector (48), and at least one upper deflector (22), and a framework (10) which carries the deflectors and the filter belt, wherein in the area of the upper deflector a wiper (27) is arranged which can be driven to rotate and is arranged on a swinging link (35) which is mounted on the framework, the swinging link being supported against the weight of the wiper by a support, and the support being arranged together with the upper deflector on a common carrier (39) which is adjustable with respect to the framework.

20. A conveyor belt filter device for mechanically cleaning a liquid (17) which flows through a channel (15) and is polluted with solids, comprising an endless filter belt (11) of interconnected flat filter elements (30) which can be pivoted against one another, and a flexible drive which is guided over a lower deflector (48), and at least one upper deflector (22), and a framework (10) which carries the deflectors and the filter belt, wherein in the area of the upper deflector a wiper (27) is arranged which can be driven to rotate and is arranged on a swinging link (35) which is mounted on the framework, the swinging link being supported against the weight of the wiper by a support, and the support being arranged together with the upper deflector on a common carrier (39) which is slidably mounted to the framework.

\* \* \* \* \*